US012665753B2

(12) United States Patent  
    Kolenderski et al.

(10) Patent No.:  US 12,665,753 B2  
(45) Date of Patent:         Jun. 23, 2026

(54) METHOD FOR OPTICAL COMMUNICATIONS FOR THE TRANSMISSION OF INFORMATION AND FOR THE DISTRIBUTION OF A CRYPTOGRAPHIC KEY AND A SYSTEM FOR IMPLEMENTING THE METHOD

(71) Applicants: UNIWERSYTET WARSZAWSKI, Warsaw (PL); UNIWERSYTET MIKOLAJA KOPERNIKA, Tomn (PL)

(72) Inventors: Piotr Kolenderski, Borowno (PL); Mikolaj Lasota, Unislaw (PL); Michal Jachura, Warsaw (PL); Konrad Banaszek, Warsaw (PL)

(73) Assignees: UNIWERSYTET MIKOLAJA KOPERNIKA, Tomn (PL); UNIWERSYTET WARSZAWSKI, Warsaw (PL)

( * ) Notice: Subject to any disclaimer, the term of this patent is extended or adjusted under 35 U.S.C. 154(b) by 376 days.

(21) Appl. No.: 18/038,102

(22) PCT Filed: Nov. 30, 2021

(86) PCT No.: PCT/IB2021/061118  
§ 371 (c)(1),  
(2) Date: May 22, 2023

(87) PCT Pub. No.: WO2022/113050  
PCT Pub. Date: Jun. 2, 2022

(65) Prior Publication Data  
US 2025/0274272 A1     Aug. 28, 2025

(30) Foreign Application Priority Data

Nov. 30, 2020    (PL) ......................................... 436177

(51) Int. Cl.  
    *H04L 9/08*      (2006.01)  
    *H04B 10/50*     (2013.01)  
    *H04B 10/54*     (2013.01)

(52) U.S. Cl.  
    CPC ......... *H04L 9/0858* (2013.01); *H04B 10/503* (2013.01); *H04B 10/54* (2013.01); *H04L 2209/12* (2013.01); *H04L 2209/34* (2013.01)

(58) Field of Classification Search  
    CPC .............. H04L 9/0858; H04L 2209/12; H04L 2209/34; H04B 10/503; H04B 10/54  
    See application file for complete search history.

(56) References Cited

U.S. PATENT DOCUMENTS 5,307,410 A * 4/1994 Bennett .................. H04B 10/70  
                                                         398/40  
5,471,303 A * 11/1995 Ai ........................ G01B 9/0209  
                                                         356/497

(Continued)

FOREIGN PATENT DOCUMENTS

CN         109586911 A   *  4/2019    .......... H04L 9/0819  
CN         111147243 A      5/2020

(Continued)

OTHER PUBLICATIONS

Wang et al.; "Long-distance transmission of quantum key distribution coexisting with classical optical communication over a weakly-coupled few-mode fiber", 2020, Optics Express, vol. 28, No. 9, pp. 12558-12565. (Year: 2020).*

(Continued)

*Primary Examiner* — Alexander Lagor  
(74) *Attorney, Agent, or Firm* — Ziegler IP Law Group, LLC.

(57)                    ABSTRACT  
A method and system for optical communication with simultaneous transmission of bits of information and distribution of cryptographic key bits using laser beam intensity modu- (Continued)

lation in a transmitter and using direct detection in a receiver. A laser beam of a specific optical carrier wavelength is modulated according to a common set of modulation symbols encoding simultaneously information bits and cryptographic key bits, symbols differing in at least one parameter selected from the group with light intensity and time delay, wherein the symbols used to encode different key bits differ in light intensity.

28 Claims, 4 Drawing Sheets

(56)                References Cited

U.S. PATENT DOCUMENTS

| 6,023,361 | A | * | 2/2000 | Ford | H04J 14/02 |
| | | | | | 398/87 |
| 7,248,695 | B1 | * | 7/2007 | Beal | H04L 9/0852 |
| | | | | | 380/283 |
| 8,315,387 | B2 | * | 11/2012 | Kanter | H04L 9/0852 |
| | | | | | 380/256 |
| 8,718,485 | B2 | * | 5/2014 | Tanaka | H04L 9/0858 |
| | | | | | 398/185 |
| 9,401,766 | B2 | * | 7/2016 | Yuan | H04B 10/70 |
| 10,169,613 | B2 | | 1/2019 | Graceffo et al. | |
| 10,355,857 | B2 | * | 7/2019 | Earl | H04L 9/0825 |
| 10,439,808 | B2 | * | 10/2019 | Alleaume | H04L 9/0852 |
| 12,074,970 | B2 | * | 8/2024 | Shin | G02B 27/283 |
| 2002/0025041 | A1 | * | 2/2002 | Tomita | H04L 9/0662 |
| | | | | | 380/256 |
| 2005/0078827 | A1 | * | 4/2005 | Tajima | H04B 10/70 |
| | | | | | 380/256 |
| 2005/0190921 | A1 | | 9/2005 | Schlafer et al. | |
| 2006/0045527 | A1 | * | 3/2006 | Maeda | H04B 10/70 |
| | | | | | 398/79 |
| 2006/0263096 | A1 | * | 11/2006 | Dinu | H04J 14/02216 |
| | | | | | 398/187 |
| 2008/0013738 | A1 | * | 1/2008 | Tajima | H04L 9/0852 |
| | | | | | 380/278 |
| 2011/0317836 | A1 | * | 12/2011 | Yeh | H04L 9/0855 |
| | | | | | 380/255 |
| 2012/0177201 | A1 | * | 7/2012 | Ayling | H04L 9/0858 |
| | | | | | 380/278 |
| 2012/0177365 | A1 | * | 7/2012 | Winzer | H04J 14/06 |
| | | | | | 398/44 |
| 2016/0234018 | A1 | * | 8/2016 | Frohlich | H04B 10/70 |
| 2018/0241555 | A1 | * | 8/2018 | Choi | H04W 12/037 |
| 2019/0044712 | A1 | * | 2/2019 | Hassan | H04L 63/061 |
| 2019/0109651 | A1 | * | 4/2019 | Su | H04J 14/0305 |
| 2019/0190707 | A1 | * | 6/2019 | Tomita | G02F 1/035 |
| 2020/0266978 | A1 | * | 8/2020 | Li | H04B 10/64 |
| 2020/0389299 | A1 | * | 12/2020 | White | H04B 10/85 |
| 2021/0083776 | A1 | * | 3/2021 | Tang | H04B 10/70 |
| 2021/0119788 | A1 | * | 4/2021 | Wang | H04B 10/272 |
| 2022/0141008 | A1 | * | 5/2022 | Lim | H04L 9/0855 |
| | | | | | 380/278 |
| 2023/0297872 | A1 | * | 9/2023 | Semo | G06N 10/40 |
| | | | | | 716/100 |

FOREIGN PATENT DOCUMENTS

| CN | 111245606 | A | * | 6/2020 | H04L 9/0852 |
| CN | 211352207 | U | * | 8/2020 | |
| CN | 211860134 | U | * | 11/2020 | |
| EP | 3244566 | B1 | | 8/2020 | |
| GB | 1278490 | A | | 6/1972 | |
| GB | 2617351 | A | * | 10/2023 | H04L 9/0852 |
| WO | 0160104 | A1 | | 8/2001 | |

OTHER PUBLICATIONS

Zhang et al.; "Efficient Quantum Key Distribution based on Pulse-Position Modulation", 2014, Proceedings of SPIE vol. 9254, pp. 1-7. (Year: 2014).*

Townsend, "Simultaneous quantum cryptographic key distribution and conventional data transmission over installed fibre using wavelength-division multiplexing", 1997, IEE, pp. 1-2. (Year: 1997).*

Li et al.; "Manipulating orbital angular momentum entanglement by using the Heisenberg uncertainty principle", Aug. 2018, Optics Express, vol. 26, No. 17, pp. 21725-21735. (Year: 2018).*

Domanski et al.; "Bandwidth Measurement Method for Quasi-Monochromatic Light Sources", Aug. 2009, IEEE Transactions on Instrumentation and Measurement, vol. 58, No. 8,, pp. 2606-2610. (Year: 2009).*

Papen et al. "Fundamentals of optical telecommunication" Academic Series WWSI Informatics and Telecommunications, ISBN 978-83-952678-0-2, Chapter 6, 37 pages.

M. Peev and A. Poppe et al., Toward the Integration of CV Quantum Key Distribution in Deployed Optical Networks, vol. 30, No. 7, Apr. 1, 2018, 650-653, DOI: 10.1109/LPT.2018.2810334, 4 pages.

N. Gisin, G. Ribordy, W. Tittel and H. Zbinden, "Quantum Cryptography" Reviews of Modern Physics, vol. 74, January 20022002, 145-195, vol. 74, DOI: 10.1103/RevModPhys. 7 4.145, 51 pages.

Papen et al. "Fundamentals of optical telecommunication" Academic Series WWSI Informatics and Telecommunications, ISBN 978-83-952678-0-2, Chapter 6, English Translation, 37 pages.

Papen et al. "Fundamentals of optical telecommunication" Academic Series WWSI Informatics and Telecommunications, ISBN 978-83-952678-0-2, Chapter 10, 49 pages.

Papen et al. "Fundamentals of optical telecommunication" Academic Series WWSI Informatics and Telecommunications, ISBN 978-83-952678-0-2, Chapter 10, English Translation 49 pages.

European Patent Office, International search report, PCT/ IB2021/061118, Mar. 30, 2022, 3 pages.

Kuta et al. "Intensity modulation and direct detection quantum key distribution based on quantum noise" New Journal of Physics, Published Jan. 8, 2016, 14 pages.

* cited by examiner (a)

Information bit stream

Key bit stream (b)

(c)               (d)

$$\left(\frac{N_1}{N_2}\right), \left(\frac{P_1}{P_2}\right)$$

(a)

(b)

(c)           (d)

$$\left(\frac{N_0}{N_1}\right), \left(\frac{P_0}{P_1}\right)$$

(a)

(b)

(c)

$$\left(\frac{P_0}{P_1}, \frac{P_2}{P_3}, \frac{P_4}{P_5}, \frac{P_6}{P_7}\right)$$

(a)

(b)

METHOD FOR OPTICAL COMMUNICATIONS FOR THE TRANSMISSION OF INFORMATION AND FOR THE DISTRIBUTION OF A CRYPTOGRAPHIC KEY AND A SYSTEM FOR IMPLEMENTING THE METHOD

TECHNICAL FIELD

The aspects of the disclosed embodiments relate to a method for optical communications involving simultaneous transmission of information and distribution of a cryptographic key, based on intensity modulation of an optical carrier wave and on direct detection thereof, wherein it is possible to carry out a simultaneous transmission of a bit stream of classical information as well as quantum distribution of a cryptographic key, implemented using a single optical carrier wavelength. This means that a single communication channel is established between the transmitter and the receiver using a light beam of a selected optical carrier wavelength. The channel is being used for simultaneously transmitting information bits and cryptographic key bits from the transmitter to the receiver. The aspects of the disclosed embodiments also includes an optical communications system allowing for simultaneous transmission of classic information and cryptographic key distribution or quantum cryptographic key distribution, based on intensity modulation of an optical carrier wave and direct detection thereof, which embodies the inventive method. The intensity of light is in a strictly monotonic relationship to the number of photons and to the light power.

PRIOR ART

Various prior art modulation formats are used to encode and transmit information using electromagnetic waves at optical frequencies, described for example in the monographs [(i) G. C Papen and R. E. Blahut, Lightwave communications, Cambridge University Press, 2019 pp. 970, and (ii) Bogdan Galwas, "*Podstawy telekomunikacji optofalowej*", (Basics of optical wave telecommunications), ISBN 978-83-952678-0-2, published as part of the WSCS Academic Series "Informatyka i Telekomunikacja" (Computer Science and Telecommunications), Open Access publication available online at http://akademickaseri-awwsi.wwsi.edu.p/]. The simplest method for modulating an optical signal is a method where a carrier wave is transmitted (corresponding to a bit value of 1) or blocked (corresponding to a bit value of 0). Accordingly, the alphabet used for communications consists of two symbols that differ in the amplitude of the carrier wave. This method is referred to in the literature as amplitude-shift keying or OOK (On-Off Keying) format. For example, the invention described in international patent application [WO0160104A1] uses an OOK modulation protocol in the embodiment.

PPM (Pulse Position Modulation) is a type of signal modulation in which the information is encoded in the pulse time position. As a rule, pulses are transmitted in predetermined time slots, while the value of coded bits is read based on the position of the pulse relative to the starting point of the time frame. The number of possible pulse positions within a single time frame is referred to as PPM order, which also determines the number of symbols (time slots) used in communication. An exemplary embodiment of the use of PPM modulation is described in a UK patent document [GB1278490].

Separate fields of the state of the art include methods of quantum cryptography, which is a set of procedures for transmitting secret (encrypted) messages with security guaranteed by the fundamental laws of quantum mechanics [N. Gisin, G. Ribordy, W. Tittel, and H. Zbinden "Quantum Cryptography" *Review of Modern Physics* 74, 145-195, 2002, DOI: 10.1103/RevModPhys.74.145]. The essential element of quantum cryptography is Quantum Key Distribution (QKD), which allows two communicating parties to produce a random secret key (e.g. a sequence of bits) that can later be used to encrypt and decrypt messages, while remaining absolutely unknown to any third party.

One of the most promising techniques in terms of ease of implementation is the quantum key distribution based on amplitude modulation—direct detection presented in the paper [T. Ikuta and K. Inoue, "*Intensity modulation and direct detection quantum key distribution based on quantum noise*", New J. Phys., 18 013018, 2016, DOI: 10.1088/1367-2630/18/1/013018]. It describes a QKD scheme based on laser beam amplitude modulation and direct detection and examines it in terms of the safety level resulting from the information theory. In this scheme, two laser pulses of slightly different amplitude, encoding key bits, are sent from the transmitter. The amplitude of the pulses is then measured at the receiver, but the probability of distinguishing the pulses is very low, and in most cases the measurement result is inconclusive. In this paper, the scheme security is analysed against two typical eavesdropping methods: the beam-splitting attack and the intercept-resend attack, assuming that the transmitting and receiving devices are fully trusted. This analysis has demonstrated that the scheme allows for secure cryptographic key distribution over a short (up to a few kilometres) or medium (up to tens of kilometres) range.

Prior art solutions disclose attempts at realising conventional communication and quantum key distribution in parallel using multiple optical signals with different carrier waves, transmitted over a single optical channel. For example, in paper [M. Peev, A. Poppe et al., IEEE Photonics Technology Letters, "*Toward the Integration of CV Quantum Key Distribution in Deployed Optical Networks*" 30, 7, 650-653, 2018, DOI: 10.1109/LPT.2018.2810334] several wavelengths were used to transmit information (using OOK-modulated signals), while a separate wavelength was used for quantum key distribution. In this publication, the cryptographic key was transmitted at a wavelength of 1550 nm, while information was transmitted at other wavelengths, specifically in ranges of 1530-1545 nm, 1530-1535 nm and/or 1552-1561 nm.

US patent document [U.S. Ser. No. 10/169,613B2] of 2016 describes a data transmission technique and device, wherein covert symbols are transmitted in addition to a standard set of overt symbols. The information transmitted by the covert symbols is used to authenticate the sender. According to the scheme, the information transmitted by additional modulation will resemble a detection noise to a potential eavesdropper and/or the eavesdropper's receiver will be technologically insufficient to detect the covert symbols. This prevents third parties, unaware of the covert modulation, from attempting to impersonate the sender. The described technique is particularly important to verify the identity of the sender of the message.

The European patent document [EP3244566B1] of 2016 describes a continuous-variable-based quantum cryptographic key distribution (CV-QKD) scheme, wherein laser pulses are sent as phase references in one optical channel in addition to laser pulses encoding the key. Key coding pulses and reference pulses alternately propagate through the optical channel. The document discloses a system and an associated method for implementing a QKD protocol, based on coherent optical communications. Thanks to reference pulses, the presented scheme has a high tolerance against phase distortions in the optical path and allows the use of standard telecommunication equipment with reduced technical requirements with respect to phase noise, such as e.g. diode lasers with average spectral linewidths.

US application [US 2005/0190921 A1] discloses a typical arrangement for transmitting encrypted data and implementing quantum cryptographic key distribution, using the standard BB84 protocol, wherein two communication channels (410 and 415) are required to contact two endpoints (405a and 405b). The encrypted data is transmitted over a public network (410), while the quantum cryptographic key is transmitted over optical fibre (415), or free-space optics channel, as clearly disclosed e.g. in FIG. 4 of said document. Thus, in this solution, unlike in the disclosed embodiments, the data transmission and the key distribution are achieved using two different channels rather than using a single channel. They are also not achieved using a single light beam of a single optical carrier wavelength. Unlike in the disclosed embodiments, a set of symbols differing in polarisation is used for the quantum key distribution, as explained in FIG. 3 of the document. A typical transmitter as described in the document emits pulses of light with a constant energy comparable to that of a single photon.

Chinese documents [CN111147243A and CN211352207U] published in 2020, and filed by the same inventors in the name of the same applicant, disclose a method and a system for simultaneous optical single-wavelength quantum and classical communication. Both documents rely on coherent modulation techniques where a set of symbols differing in two parameters i.e. phase and amplitude is used. In both documents the symbols are detected using a homodyne receiver. Document [CN'243] disclose a method for a single wavelength quantum and classical communication based on LLO (local local oscillator).

Problem from Prior Art

The prior art problem is the simultaneous transmission of information and the distribution of the cryptographic key, requiring two different optical (free-space or fibre) channels which require the use of two different light sources. Another prior art problem is the simultaneous transmission of information and the cryptographic key, requiring a single optical (free-space or fibre) channel, and two light sources of different wavelengths, each dedicated to the transmission of the cryptographic key or the transmission of information. In prior art solutions, in order to transmit a cryptographic key (e.g. QKD), it is usually necessary to have a separate, dedicated infrastructure, e.g. optical fibre or satellite.

Transmission of key bits and information bits at a single optical wavelength using amplitude modulation and direct detection is not used in prior art solutions due to several independent factors:

(i) low quantum efficiency of photodiodes and detectors enabling measurement with photon number resolution (e.g. transition-edge sensors), available in prior art until recently; they were developed and improved over the last few years, so that new applications continue to be found for them;

(ii) unavailability, before 2016, of a technique for secure key distribution using amplitude modulation and direct detection; it was only in 2016 that the feasibility of such techniques was theoretically proposed [reference on page 3, T. Ikuta and K. Inoue, DOI: 10.1088/1367-2630/18/1/013018], while technologies inspired by this discovery are still being developed;

(iii) due to the intensive development of quantum cryptography techniques based on key encryption using phase or polarisation of single photons, prior art documents guide a person skilled in the art towards solutions using phase or polarisation modulation, underscoring their advantages, thus there is a natural tendency for this course of technological development to be pursued;

(iv) In standard optical telecommunications offered commercially, dozens of laser beams differing in wavelength are propagating in optical fibres (referred to as dense wavelength division multiplexing, DWDM), allowing bitrates of the order of 1 Tbps [TeraBits Per Second] to be achieved, with no physical-layer guarantee of transmission security. The transmission of key bits and information bits at a single wavelength is of little interest in the telecommunications services market, because the potential customers of solutions of this type are primarily entities transmitting data that require higher security standards, such as financial institutions, military units, government administration or special services.

Glossary and Definitions of the Prior Art Terms Used in the Description

The terms used in the present description have the following meaning, as described in the definitions below:

The term "information bit" denotes a data bit which cannot be used as a cryptographic key bit because it is theoretically possible to eavesdrop on it.

The term "cryptographic key bit" denotes a data bit which can be used as a cryptographic key because it is impossible to eavesdrop on it under the assumptions made in the document.

The term "direct detection" denotes a method of signal measurement which measures the intensity of an optical electromagnetic wave or the number of photons.

The term "beam wavelength" denotes the central wavelength of the beam as measured e.g. by a spectrometer.

The term "discriminator" denotes a typical (known) device used in electronics, most often an electronic system which classifies incoming electrical signals according to a specific criterion, such as voltage threshold, signal shape, etc. In the disclosed solution, a discriminator is used in a detector to read the value of information bits and/or cryptographic key bits based on an electrical signal generated by a photodetector/single photon detector/single photon counter.

The term "FSO" (Free Space Optics) refers to a wireless optical communications technology that uses light emission and reception in free space to transmit data between two points. It is useful when physical connections using fibre optic cables are impractical due to high costs (e.g. in geographically remote regions), impossible to implement (such as for water vessels and aircraft), or when the distance between the sender and the recipient is too long, so that optical signal losses in the optical fibre render communication impossible.

The term "IM/DD" refers to intensity modulation and direct detection, which is a generic term describing a class of non-coherent modulation formats such as OOK, PPM, and PAM, as described herein.

The term "communication channel" denotes a logical connection between a transmitter and a receiver. Physically, it is achieved with a beam of light propagating through an optical fibre or free space (FSO).

The term "OOK" On-Off Keying denotes the simplest modulation form of amplitude shift keying (ASK—which is a type of digital modulation that represents a digital signal as a changing carrier wave amplitude), representing digital data as the presence or absence of a carrier wave. In its simplest form, the presence of a carrier wave for a specific time represents a bit value of one, while its absence for the same time represents a bit value of zero.

The term "PPM" refers to the modulation format of encoding information in the pulse time position.

The term "set of modulation symbols" is a set of electromagnetic field states (symbols) unique to a given modulation format including, in particular, states (symbols) differing in frequency/wavelength, intensity/amplitude/power (e.g. OOK modulation), time delay (e.g. PPM modulation), or polarisation. Each symbol in the set is assigned a bit string that is predominantly unique.

The term "QKD" denotes Quantum (cryptographic) Key Distribution.

The terms "light power" and "light intensity" are used herein to denote, interchangeably, the same parameter. This parameter is directly correlated to the light wave amplitude or equivalently to the average number of photons in the beam.

Other terms non-defined herein have the meaning as established and understood by a person skilled in the art in the light of his/her best knowledge, of the present disclosure, and of the context of the patent application description.

Solution to the Problem

The aspects of the disclosed embodiments refer to the use of modified (extended) amplitude modulation (OOK, PAM), or pulse arrival time related (PPM) formats, that is formats using intensity modulation and direct detection (IM/DD) of an optical carrier wave. The standard set of symbols used for the transmission of information is modified (extended) so that some or all symbols encode both cryptographic key bits and information bits at once, using a single optical carrier wavelength. The number of symbols is increased to allow the transmission of various values of information bits and cryptographic key bits. Symbols that encode different bits of a cryptographic key differ in power (intensity) of the optical beam or equivalently in the average number of photons. The solutions use a single quasi-monochromatic light beam (i.e. a beam having a specific central wavelength), and a single communication channel between a transmitter and a receiver is established using this beam, while by modulating the beam both information bits and cryptographic key bits are encoded.

The solution to the problem is not a system consisting of a laser with a light beam that is being divided by a beam splitter or a fibre-optic power coupler, where the first light beam is being used to transmit information bits, and the other beam is being used to transmit cryptographic key bits.

The present solution has been enabled e.g. by the rapid increase in the availability of fast photodiodes with very high quantum efficiency.

DETAILED DESCRIPTION OF THE DISCLOSURE

The inventive method for optical communication with simultaneous transmission of bits of information and distribution of cryptographic key bits using laser beam intensity modulation in a transmitter and using direct detection in a receiver, characterised in that a laser beam of a specific optical carrier wavelength is modulated according to a common set of modulation symbols encoding simultaneously information bits and cryptographic key bits, wherein symbols used to encode different information bits differ in exclusively a single parameter selected from the group comprising light intensity and time delay, while symbols used to encode different cryptographic key bits differ exclusively in light intensity.

Preferably, the sets of modulation symbols used in the communication are modified (extended) versions of standard modulation formats: amplitude-based 'OOK', 'PAM', or time delay-based 'PPM'.

Preferably, a continuous-wave laser or a pulsed laser with a high repetition rate connected by an optical path to an amplitude modulator, preferably emitting quasi-monochromatic light of a wavelength in the range of 400 to 1600 nm, is used as a source of a laser beam of a specific light carrier wavelength.

Preferably, an amplitude modulator is used to simultaneously encode an information bit stream and a cryptographic key bit stream.

Alternatively, preferably, a laser with a direct beam modulation system, in particular current modulation of the laser diode, preferably emitting quasi-monochromatic light of a wavelength in the range of 400 to 1600 nm is used as a laser beam source of a specific light carrier wavelength.

In another preferred embodiment, two or more laser diodes emitting light beams of the same wavelength, preferably in the range of 400 to 1600 nm, but of different light power, are used as a source of a laser beam of a specific optical carrier wavelength, wherein the beams emitted by two or more laser diodes are combined into a single light beam of a specific light carrier wavelength.

Preferably, a receiver comprising a photodiode or photon number detector is used, which is connected to a discriminator.

Preferably, a receiver comprising a photodiode used to measure the power of a light beam is used, for optical signals with a power of more than 100 nW.

Alternatively preferably, a receiver comprising a photon number detector used to measure single photons is used, for optical signals with a power of less than 100 nW.

Preferably, the discriminator is used to simultaneously decode the information bit stream and the cryptographic key bit stream.

Preferably, in the extended OOK modulation format, the ratio $$\left(\frac{N_1}{N_2}\right)$$

of the average number of photons in pulses corresponding to different bits of the cryptographic key in the scheme using single photon detection is more than 50%.

Preferably, in the extended PPM modulation format, the ratio

of the average number of photons in pulses corresponding to different bits of the cryptographic key in the scheme using single photon detection is more than 50%.

Preferably, in the extended OOK modulation format, the ratio $$\left(\frac{P_1}{P_2}\right)$$

of the power of pulses corresponding to different bits of the cryptographic key in the scheme using photodiode detection is more than 85%.

Preferably, in the extended PPM modulation format, the ratio $$\left(\frac{P_0}{P_1}\right)$$

of the power of pulses corresponding to different bits of the cryptographic key in the scheme using photodiode detection is more than 85%.

Preferably, in the extended PAM modulation format, each of the pulse power ratios $$\left(\frac{P_0}{P_1}, \frac{P_2}{P_3}, \frac{P_4}{P_5}, \frac{P_6}{P_7}\right)$$

corresponding to different bits of the cryptographic key in the scheme using photodiode detection is more than 85%.

Preferably, in the method according to the aspects of the disclosed embodiments, a single communication channel is established between the transmitter and the receiver using a laser beam of a specific optical carrier wavelength, with the channel being used for simultaneously transmitting information bits and cryptographic key bits from the transmitter to the receiver.

Preferably, in the method according to the aspects of the disclosed embodiments, the transmitter and the receiver are connected by one or more additional communication channels, preferably by a radio channel.

The aspects of the disclosed embodiments also includes a system adapted to optical communication realising simultaneous transmission of information bits and distribution of cryptographic key bits using intensity modulation and direct detection comprising a transmitter and a receiver, where the transmitter comprises a source of a modulated laser beam of a specific optical carrier wavelength, while the receiver comprises a photodiode or a photon number detector connected to a discriminator, which is characterised in that the transmitter is adapted to simultaneously transmit at a specific optical carrier wavelength information bits and cryptographic key bits using a common set of modulation symbols, wherein symbols used to encode differ ent information bits differ in exclusively a single parameter selected from the group comprising intensity and time delay, while symbols used to encode different key bits differ in exclusively light intensity.

Preferably, the source of the modulated laser beam of a specific optical carrier wavelength is a continuous-wave laser or a pulsed laser with a high repetition rate, preferably adapted to emit quasi-monochromatic light of a wavelength in the range of 400 to 1600 nm, connected by an optical path to an amplitude modulator.

Alternatively, preferably, the source of the modulated laser beam of a specific optical carrier wavelength is a laser with a direct beam modulation system, in particular current modulation of a laser diode, preferably adapted to emit quasi-monochromatic light of a wavelength in the range of 400 to 1600 nm.

In another preferred embodiment, the source of the modulated laser beam of a specific optical carrier wavelength is based on two or more laser diodes adapted to emit a light beam of the same wavelength, preferably in the range of 400 to 1600 nm, but of a different power.

Preferably, the receiver comprises a photodiode for measuring light beam power or a photon number detector for measuring single photons, which is connected to a discriminator.

Preferably, the discriminator is adapted to simultaneously decode the information bit stream and the cryptographic key bit stream.

Preferably, the modulator is adapted to implement a modified (extended) OOK modulation format, wherein the number of symbols is increased by adding symbols that allow to distinguish key bits based on light intensity levels, and the ratio $$\left(\frac{N_1}{N_2}\right)$$

of the average number of photons in pulses corresponding to different cryptographic key bits in the scheme using single photon detection is more than 50%.

Alternatively preferably, the modulator is adapted to implement a modified (extended) PPM modulation format, wherein the number of symbols is increased by adding symbols that allow to distinguish key bits based on light intensity levels, and the ratio $$\left(\frac{N_0}{N_1}\right)$$

of the average number of photons in pulses corresponding to different cryptographic key bits in the scheme using single photon detection is more than 50%.

Alternatively preferably, the modulator is adapted to implement a modified (extended) OOK modulation format, wherein the number of symbols is increased by adding symbols that allow to distinguish key bits based on light intensity levels, and the ratio $$\left(\frac{P_1}{P_2}\right)$$

of light power of pulses corresponding to different cryptographic key bits in the scheme using photodiode detection is more than 85%.

Alternatively preferably, the modulator is adapted to implement a modified (extended) PPM modulation format, wherein the number of symbols is increased by adding symbols that distinguish key bits based on light intensity levels, and the ratio $$\left(\frac{P_0}{P_1}\right)$$

of light power of pulses corresponding to different cryptographic key bits in the scheme using photodiode detection is more than 85%.

Alternatively preferably, the modulator is adapted to implement a modified (extended) PAM modulation format, wherein the number of symbols is increased by adding symbols that allow to distinguish key bits based on light intensity levels, and each of the ratios of light power of pulses $$\left(\frac{P_0}{P_1}, \frac{P_2}{P_3}, \frac{P_4}{P_5}, \frac{P_6}{P_7}\right)$$

corresponding to different cryptographic key bits in the scheme using photodiode detection is more than 85%.

Advantages

The aspects of the disclosed embodiments according to the present patent specification have a number of advantages.

The aspects of the disclosed embodiments allow for secure distribution of the cryptographic key if the optical channel is eavesdropped. Secure distribution of the cryptographic key is possible even if the eavesdropper has more optical signal power available than the authorised recipient. Accordingly, the potential presence of an eavesdropper, indicated by an anomalous drop in the received signal power, can be ignored for a very large range of power drops without affecting the security level.

Using a common set of symbols to transmit information bits and cryptographic key bits allows for secure communication between the sender and the recipient using standard telecommunications infrastructure (optical fibres, modulators, photodiodes) in contrast to quantum cryptography techniques which require dedicated infrastructure (a separate satellite optical link or optical fibre link) and specialised equipment (sources of single photons, detectors of single photons) or coherent detection systems.

Furthermore, the fact that the different bits of the cryptographic key are encoded using symbols that differ in light intensity (equivalently, light power or average photon number), makes it possible to use direct detection shot noise to ensure the security of the cryptographic key distribution.

DESCRIPTION OF THE DRAWINGS

The aspects of the disclosed embodiments will be presented in greater detail in preferred embodiments, with reference to the accompanying drawing, in which.

The figures use terms and descriptions that are consistent with the glossary definitions.

EMBODIMENTS

The following embodiments are presented only in order to illustrate the invention and explain its individual aspects, and not for its limitation, and they should not be associated with its entire scope which is defined in the appended claims.

Example 1

Simultaneous Transmission of Information and Distribution of a Cryptographic Key Using Modified (Extended) OOK (On-Off Keying) Modulation Format In the following example shown in FIG. 1(a) a transmitter is used, wherein the light source is a laser (with a selected wavelength in the range of 400-1600 nm), the beam of which is modulated by an amplitude modulator. A set of three modulation symbols shown in FIG. 1(b), for which the laser pulses differ in optical power, and thus in average photon number, is used for communications. The optical powers of the individual pulses were denoted as $P_0$, $P_1$, $P_2$, and the associated average photon number was denoted as No, $N_1$, $N_2$. A single bit of information (shown in bold) and a single bit of the cryptographic key (shown in italics) are assigned to the pulses with an optical power of $P_1$, $P_2$. The optical power of the pulse associated with information bit value 0 was denoted as $P_0$, the optical power of the pulse associated with information bit value 1 and key bit value 0 was denoted as $P_1$, and the optical power of the pulse associated with information bit value 1 and key bit value 1 was denoted as $P_2$. The average photon numbers in the pulses were denoted accordingly. The pulse powers were selected so that different bits of classical information correspond to pulses with a much higher power difference than in the case of pulses corresponding to different bits of a cryptographic key, i.e. $P_1-P_0 \gg P_2-P_1$. In particular, in the modified (extended) OOK format, the value of information bit 0 is encoded in the absence of a pulse i.e. $P_0=N_0=0$.

Figure 1:
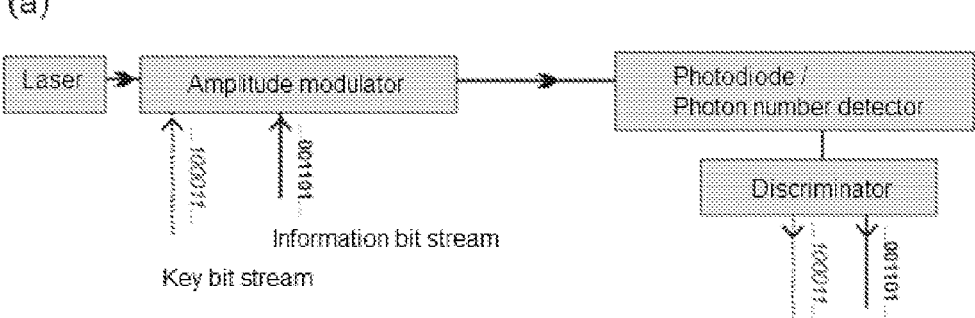
FIG. 1 shows an embodiment for simultaneous transmission of information and distribution of a cryptographic key using a modified (extended) OOK modulation format. (a) a system diagram of the embodiment. (b) a set of symbols used in the inventive method. (c) a detection diagram using a single photon detector showing the probability of detection of a specific number of photons depending on the symbol sent, along with decision thresholds indicated by dash-dotted lines. (d) a detection diagram using a photodiode, showing the probability of detecting a specific photocurrent value depending on the symbol sent, along with decision thresholds indicated by dash-dotted lines.
Figure 1:
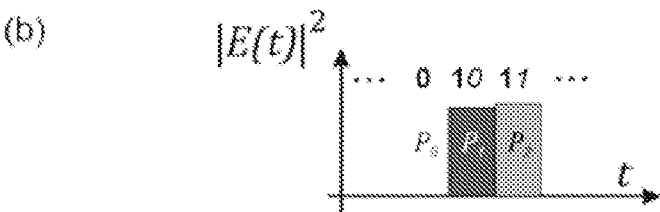
Figure 1:
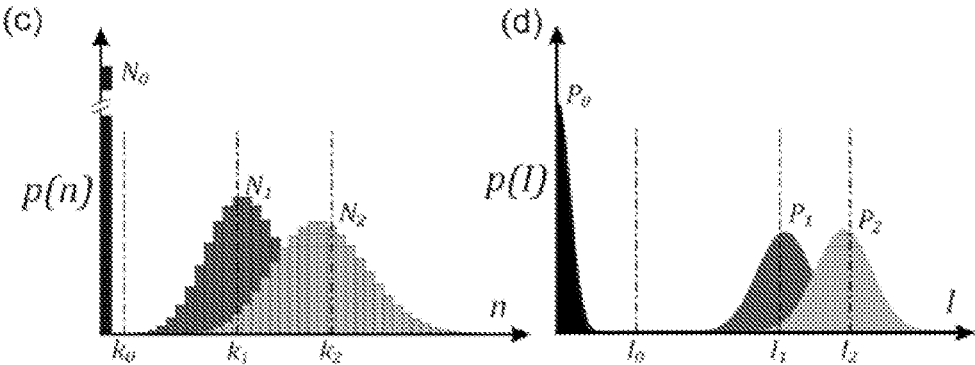

Depending on the beam power reaching the receiver, two detection schemes can be implemented therein. The first scheme uses a detector with photon number resolution (e.g. Transition Edge Sensors), the second scheme uses a photodiode (e.g. FINISAR XPDV21x0R) with its photocurrent being proportional to the photon flux (optical beam power). The scheme in which the photon number measurement is performed in the receiver is illustrated in FIG. 1 (c), while the scheme in which a photodiode is used for the measurement is illustrated in FIG. 1 (d). The ratio of the average number of photons in pulses corresponding to different key bits $N_1/N_2$ in the scheme using single photon detection is more than 50% (see Table 1). The power ratio $P_1/P_2$ of pulses corresponding to different key bits in the scheme using photodiode detection is more than 85% (see Table 2).

In the scheme using the photon number measurement, the detection of the information bit and the cryptographic key bit is achieved using predetermined decision thresholds defined by natural numbers $k_0$, $k_1$, $k_2$ presented in FIG. 1 (c) as vertical dash-dotted lines. In the figure, the illustrative values $N_0=0$, $N_1=16$ and $N_2=24$ were used. The scheme for reading the bit values is as follows:

If the measured number of photons n is in the range $(0,k_0]$, the value of the information bit is 0, and the value of the key bit is undefined.

If the measured number of photons n is in the range $(k_0,k_1)$, the value of the information bit is 1, and the value of the key bit is 0.

If the measured number of photons n is in the range $[k_1,k_2]$, the value of the information bit is 1 and the value of the key bit is undefined.

If the measured number of photons n is greater than $k_2$, the information bit value is 1, and the key bit value is 1.

Given that in the modified (extended) OOK format the value of information bit 0 is encoded in the absence of a pulse, i.e. $N_0=0$, the threshold value $k_0$ may be selected to be 0, which means that zero counts correspond to the detection of information bit 0. Optimal values $N_1$, $N_2$ and decision thresholds $k_1$, $k_2$ may be calculated analytically. They depend on a number of factors such as detection noise in the receiver and the average power of the received signal. Assuming that a potential eavesdropper has as much signal power available as an authorised recipient, and assuming that the detection of the number of photons is only affected by the shot noise, optimal operating conditions of the presented transmission scheme were presented in Table 1 based on analytical calculations.

TABLE 1

Optimal operating points of the system for information transmission and cryptographic key distribution using the modified (extended) OOK modulation format and photon number detector, see FIG. 1(c).

| $(N_1 + N_2)/2$ | $N_0$ | $N_1$ | $N_2$ | $k_0$ | $k_1$ | $k_2$ |
|---|---|---|---|---|---|---|
| 15 | 0 | 10.59 | 19.41 | 0 | 11 | 19 |
| 20 | 0 | 14.90 | 25.10 | 0 | 15 | 25 |
| 25 | 0 | 19.30 | 30.70 | 0 | 19 | 31 |
| 30 | 0 | 23.76 | 36.24 | 0 | 24 | 36 |
| 35 | 0 | 28.26 | 41.74 | 0 | 28 | 42 |
| 40 | 0 | 32.79 | 47.21 | 0 | 33 | 47 |
| 45 | 0 | 37.35 | 52.65 | 0 | 38 | 52 |
| 50 | 0 | 41.94 | 58.06 | 0 | 42 | 58 |

In the scheme using optical signal power measurement by means of a photodiode, the detection of the information bit and the cryptographic key bit is achieved using predetermined decision thresholds defined by the values of the measured photocurrent $I_0$, $I_1$, $I_2$ presented in FIG. 1 (d) as vertical dash-dotted lines. The scheme for reading the bit values is as follows:

If the measured value of photocurrent I is in the range $(0,I_0)$, the value of the information bit is 0, and the value of the key bit is undefined.

If the measured value of photocurrent I is in the range $[I_0,I_1)$, the value of the information bit is 1, and the value of the key bit is 0.

If the measured value of photocurrent I is in the range $[I_1,I_2]$, the value of the information bit is 1, and the value of the key bit is undefined.

If the measured value of photocurrent I is greater than $I_2$, the information bit value is 1, and the key bit value is 1.

Due to the substantial power separation of the signals associated with the different bits of information, the selection of the threshold value $I_0$ does not present any practical technical difficulty. It should be selected so as to minimise the probability of misdetection of the information bit. In particular, if the detection of the signals associated with information bits 0 and 1 is accompanied by the same noise, the threshold may be set as half of the distribution average of the photocurrent associated with the measurement of pulse $P_1$ (see Table 2). The optimal values of $P_1$, $P_2$ and decision thresholds $I_0$, $I_1$, $I_2$ depend on a number of factors such as detection noise at the receiver and the average power of the received signal. Assuming that a potential eavesdropper has as much signal power available as an authorised recipient, and assuming that the photocurrent detection is only affected by the shot noise optimal operating conditions of the presented transmission scheme were presented in Table 2 based on analytical calculations. Moreover, Table 2 assumes that the photodiode quantum efficiency is 50% and the measurement time of a single symbol is 1 ns [nanosecond].

TABLE 2

Optimal operating points of the system for information transmission and cryptographic key distribution using the modified (extended) OOK modulation format and photodiode, see FIG. 1(d).

| $(P_1 + P_2)/2$ | $P_0$ | $P_1$ | $P_2$ | $I_0$ | $I_1$ | $I_2$ |
|---|---|---|---|---|---|---|
| 0.128 μW | 0 | 0.124 μW | 0.132 μW | 38.5 nA | 77.3 nA | 82.9 nA |
| 1.282 μW | 0 | 1.268 μW | 1.297 μW | 395.8 nA | 791 nA | 809 nA |
| 12.82 μW | 0 | 12.77 μW | 12.87 μW | 3.99 μA | 7.97 μA | 8.04 μA |
| 128.25 μW | 0 | 128.10 μW | 128.40 μW | 39.9 μA | 79.9 μA | 80.1 μA |
| 1.2825 mW | 0 | 1.2820 mW | 1.2830 mW | 400.34 μA | 800.49 μA | 801.05 μA |

TABLE 2-continued

Optimal operating points of the system for information transmission and cryptographic key distribution
using the modified (extended) OOK modulation format and photodiode, see FIG. 1(d).

| $(P_1 + P_2)/2$ | $P_0$ | $P_1$ | $P_2$ | $I_0$ | $I_1$ | $I_2$ |
|---|---|---|---|---|---|---|
| 12.82 mW | 0 | 12.81 mW | 12.83 mW | 4.00340 mA | 8.00679 mA | 8.00858 mA |
| 128.25 mW | 0 | 128.24 mW | 128.26 mW | 40.040 mA | 80.074 mA | 80.079 mA |
| 1.2825 W | 0 | 1.2824 W | 1.2826 W | 400.38 mA | 800.76 mA | 800.78 mA |

It was observed that the optimal operating points change when the signal detection, in addition to shot noise, is affected by the noise caused by the fluctuations in the intensity of the emitted laser beam or by thermal noise. It was also observed that the optimal operating points change when the power of the signal measured by the eavesdropper is lower or higher than the power of the signal measured by the authorised recipient.

The discriminator is adapted to simultaneously decode the information bit stream and the cryptographic key bit stream.

Example 2

Figure 2:
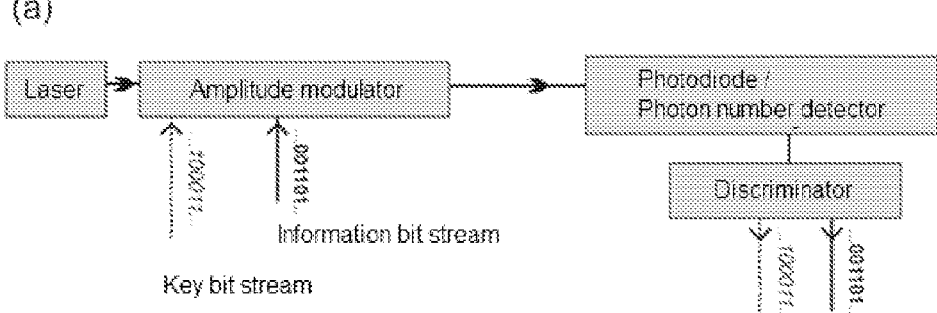
FIG. 2 shows an embodiment for simultaneous transmission of information and distribution of a cryptographic key using a modified (extended) PPM modulation format. (a) a system diagram of the embodiment. (b) a set of symbols used in the inventive method. (c) a detection diagram using a single photon detector showing the probability of detection of a specific number of photons depending on the symbol sent, along with decision thresholds indicated by dash-dotted lines. (d) a detection diagram using a photodiode, showing the probability of detecting a specific photocurrent value depending on the symbol sent, along with decision thresholds indicated by dash-dotted lines.
Figure 2:
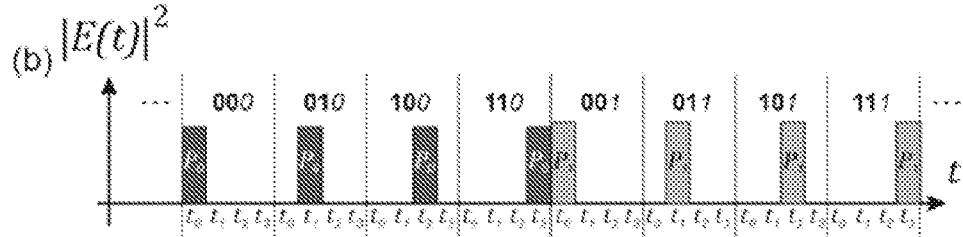
Figure 2:
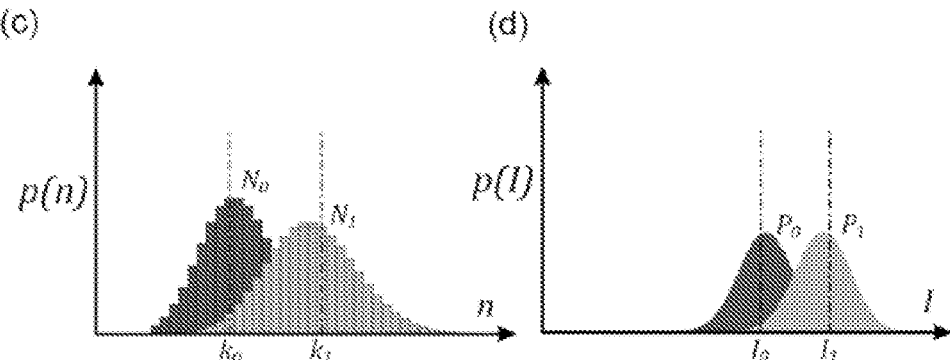

Simultaneous Transmission of Information and Distribution of a Cryptographic Key Using Modified (Extended) PPM (Pulse-Position) Modulation Format of the Order of Four An example embodiment using modified (extended) PPM modulation is described in the following example shown in FIG. 2 (a). It uses a transmitter wherein the light source in the system is a laser (with a wavelength selected from the range of 400-1600 nm), the beam of which is modulated by an amplitude modulator (e.g. EOSPACEAX-OS5-10-PFU-PFU-UL). Communications use a set of eight modulation symbols for which the laser pulses differ in optical power (average number of photons) and pulse emission time measured relative to the start of the PPM frame (time interval that is four times longer than the pulse duration). Different bits of information correspond to pulses that differ in the emission time. Different bits of the cryptographic key correspond to symbols that differ in power. The information bits (bold font) are read based on the time position of the pulse, while the cryptographic key bits (italics) are read based on the pulse power measurement or equivalently average photon number. FIG. 2 (b) shows a set of eight symbols for the modified (extended) PPM modulation format of the order of four. The optical powers of the individual pulses were denoted as $P_0$, $P_1$, and the associated average photon number was denoted as $N_0$, $N_1$. Possible pulse arrival times relative to the beginning of the frame (vertical solid line) are indicated as $t_0$, $t_1$, $t_2$, $t_3$. The optical power of the pulses associated with key bit value 0 was denoted as $P_0$, and the optical power of the pulses associated with key bit value 1 was denoted as $P_1$. The average photon numbers in the pulses were denoted accordingly. The pulse arrival time is associated with the information bits according to the following table.

TABLE 3

Encoded bits of information depending on the transmission (detection)
time of the optical pulse measured relative to the beginning
of the PPM frame, for comparison see FIG. 2(b).

| | |
|---|---|
| $t_0$ | 00 |
| $t_1$ | 01 |
| $t_2$ | 10 |
| $t_3$ | 11 |

In the scheme using the photon number measurement, the information bit detection is realised by measuring the photon detection time according to Table 3, and the measurement of the cryptographic key bit is realised using predetermined decision thresholds defined by natural numbers $k_0$,$k_1$ presented in FIG. 2 (c) as vertical dash-dotted lines. In the figure, illustrative values of $N_0$=16, $N_2$=24, were used. The scheme for reading the cryptographic bit values is as follows:

If the measured number of photons n is in the range $(0,k_0]$, the key bit value is 0.

If the measured number of photons n is in the range $[k_0,k_1]$, the value of the key bit is undefined.

If the measured number of photons n is greater than $k_1$, the key bit value is 1.

Optimal values of No, $N_1$ and decision thresholds $k_0$, $k_1$ may be determined analytically. They depend on a number of factors such as detection noise in the receiver and the average power of the received signal. Assuming that a potential eavesdropper has as much signal power available as the receiver, and assuming that the detection of the number of photons is only affected by the shot noise, optimal operating conditions of the transmission scheme were presented in Table 4 based on analytical calculations.

TABLE 4

Optimal operating points of the system for information
transmission and cryptographic key distribution using
the modified (extended) PPM modulation format and photon
number detector, for comparison see FIG. 2(c).

| $(N_0 + N_1)/2$ | $N_0$ | $N_1$ | $k_0$ | $k_1$ |
|---|---|---|---|---|
| 15 | 10.59 | 19.41 | 11 | 19 |
| 20 | 14.90 | 25.10 | 15 | 25 |
| 25 | 19.30 | 30.70 | 19 | 31 |
| 30 | 23.76 | 36.24 | 24 | 36 |
| 35 | 28.26 | 41.74 | 28 | 42 |
| 40 | 32.79 | 47.21 | 33 | 47 |
| 45 | 37.35 | 52.65 | 38 | 52 |
| 50 | 41.94 | 58.06 | 42 | 58 |

In the scheme using photodiode-based optical signal power measurement, the information bit detection is achieved by measuring the pulse detection time in the PPM detection frame according to Table 3, while the cryptographic key bit is measured using predetermined decision thresholds defined by the measured photocurrent values $I_0$,$I_1$ presented in FIG. 2 (d) as vertical dash-dotted lines. The scheme for reading the cryptographic key bit values is as follows:

If the measured photocurrent value I is in the range $(0,I_0)$, the value of the key bit is 0.

If the measured photocurrent value I is in the range $[I_0,I_1]$, the key bit value is undefined.

If the measured photocurrent value I is greater than $I_1$ the value of the key bit is 1.

Optimal values $P_0$, $P_1$ and decision thresholds $I_0$, $I_1$ may be determined analytically. They depend on a number of factors such as detection noise in the receiver and the average power of the received signal. Assuming that a potential eavesdropper has as much signal power available as an authorised recipient, and assuming that the photocurrent detection is only affected by the shot noise, optimal operating conditions of the transmission scheme were presented in Table 5 based on analytical calculations. Moreover, Table 5 assumes that the photodiode quantum efficiency is 50% and the measurement time of a single symbol is 1 ns [nanosecond].

TABLE 5

Optimal operating points of the system for information transmission and cryptographic key distribution using the modified (extended) PPM modulation format and photodiode, see FIG. 2(d).

| $(P_0 + P_1)/2$ | $P_0$ | $P_1$ | $I_0$ | $I_1$ |
|---|---|---|---|---|
| 0.128 μW | 0.124 μW | 0.132 μW | 77.3 nA | 82.9 nA. |
| 1.282 μW | 1.268 μW | 1.297 μW | 791 nA | 809 nA |
| 12.82 μW | 12.77 μW | 12.87 μW | 7.97 μA | 8.04 μA |
| 128.25 μW | 128.10 μW | 128.40 μW | 79.9 μA | 80.1 μA |
| 1.2825 mW | 1.2820 mW | 1.2830 mW | 800.49 μA | 801.05 μA |
| 12.82 mW | 12.81 mW | 12.83 mW | 8.00679 mA | 8.00858 mA |
| 128.25 mW | 128.24 mW | 128.26 mW | 80.074 mA | 80.079 mA |
| 1.2825 W | 1.2824 W | 1.2826 W | 800.76 mA | 800.78 mA |

It was observed that the optimal operating points change when the signal detection, in addition to the shot noise, is affected by the noise caused by the fluctuations in the intensity of the emitted laser beam or by thermal noise. It was also observed that the optimal operating points change when the power of the signal measured by the eavesdropper is lower or higher than the power of the signal measured by the authorised recipient.

Example 3

Simultaneous Transmission of Information and Distribution of a Cryptographic Key Using Modified (Extended) PAM-4 (Pulse-Amplitude Modulation) Format An example embodiment using modified (extended) PAM-4 modulation is described in the following example shown in FIG. 3(a). It uses a transmitter wherein the light source in the system is a laser (of a wavelength selected from the range of 400-1600 nm), the beam of which is modulated by an amplitude modulator. A set of eight modulation symbols shown in FIG. 3(b), for which the laser pulses differ in optical power and thus in average photon number, is used for communications. The optical powers of individual pulses were denoted as $P_0$, $P_1$, $P_2$, $P_3$, $P_4$, $P_5$, $P_6$, $P_7$. The optical powers of the pulses were associated with the information bits and the cryptographic key bit according to Table 6.

TABLE 6

Figure 3:
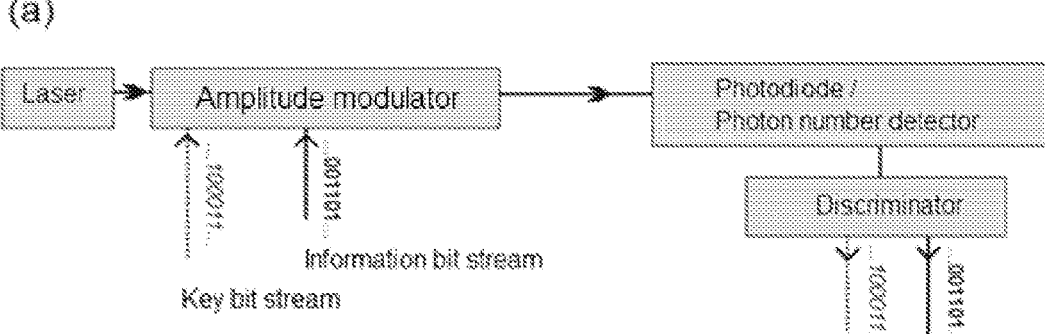
FIG. 3 shows an embodiment for simultaneous transmission of information and distribution of a cryptographic key using a modified (extended) PAM-4 modulation format. (a) a system diagram of the embodiment. (b) a set of symbols used in the inventive method. (c) a detection diagram using a photodiode, showing the probability of detecting a specific photocurrent value depending on the symbol sent, along with decision thresholds indicated by dash-dotted lines.
Figure 3:
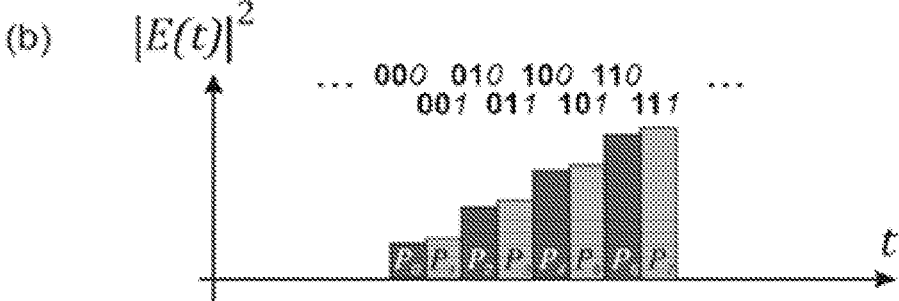
Figure 3:
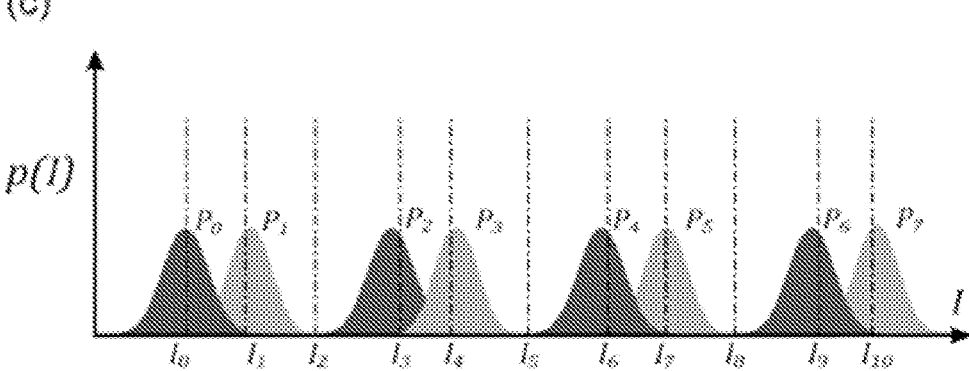

Encoded bits of information and the cryptographic key bit depending on the power of the optical pulse in a modified (extended) PAM-4 modulation format, see FIG. 3(b).

| | |
|---|---|
| $P_0$ | 000 |
| $P_1$ | 001 |

TABLE 6-continued

Encoded bits of information and the cryptographic key bit depending on the power of the optical pulse in a modified (extended) PAM-4 modulation format, see FIG. 3(b).

| | |
|---|---|
| $P_2$ | 010 |
| $P_3$ | 011 |
| $P_4$ | 100 |
| $P_5$ | 101 |
| $P_6$ | 110 |
| $P_7$ | 111 |

The pulse powers were selected so that different information bits correspond to pulses with a much higher power difference than in the case of pulses corresponding to different key bits, i.e. $P_2-P_0 \gg_1-P_0$, $P_2-P_0 \gg P_3-P_2$, $P_2-P_0 \gg P_5-P_4$, and $P_2-P_0 \gg P_7-P_6$.

A detection scheme in which a photodiode (e.g. FINISAR XPDV21x0R) is used for measurement is shown in FIG. 3(c). Detection of the information bits and the cryptographic key bit is achieved using predetermined decision thresholds defined by the values of the photocurrent measured $I_0$, $I_1$, $I_2$, $I_3$, $I_4$, $I_5$, $I_6$, $I_7$, $I_8$, $I_9$, $I_{10}$ presented in FIG. 3(c) as vertical dash-dotted lines. The scheme for reading bits value is as follows:

If the measured value of photocurrent I is in the range $(0,I_0)$, the value of the information bits is 00, and the value of the key bit is 0.

If the measured value of photocurrent I is in the range $[I_0,I_1]$, the value of the information bits is 00, and the value of the key bit is undefined.

If the measured value of photocurrent I is in the range $(I_1,I_2)$, the value of the information bits is 00, and the value of the key bit is 1.

If the measured value of photocurrent I is in the range $(I_2,I_3)$, the value of the information bits is 01, and the value of the key bit is 0.

If the measured value of photocurrent I is in the range $[I_3,I_4]$, the value of the information bits is 01, and the value of the key bit is undefined.

If the measured value of photocurrent I is in the range $(I_4,I_5]$, the value of the information bits is 01, and the value of the key bit is 1.

If the measured value of photocurrent I is in the range $(I_5,I_6)$, the value of the information bits is 10, and the value of the key bit is 0.

If the measured value of photocurrent I is in the range $[I_6,I_7]$, the value of the information bits is 10, and the value of the key bit is undefined.

If the measured value of photocurrent I is in the range $(I_7, I_8]$, the value of the information bits is 10, and the value of the key bit is 1.

If the measured value of photocurrent I is in the range $(I_8, I_9)$, the value of the information bits is 11, and the value of the key bit is 0.

If the measured value of photocurrent I is in the range $[I_9, I_{10}]$, the value of the information bits is 11, and the value of the key bit is undefined.

If the measured value of photocurrent I is greater than $I_{10}$, the value of the information bits is 11, and the key bit value is 1.

Optimal values $P_0$, $P_1$, $P_2$, $P_3$, $P_4$, $P_5$, $P_6$, $P_7$ and decision thresholds $I_0$, $I_1$, $I_2$, $I_3$, $I_4$, $I_5$, $I_6$, $I_7$, $I_8$, $I_9$, $I_{10}$, may be determined analytically. They depend on a number of factors such as detection noise in the receiver and the average power of the received signal. Assuming that a potential eavesdropper has as much signal power available as an authorised recipient, and assuming that the photocurrent measurement is only affected by the shot noise optimal operating conditions of the presented transmission scheme were presented in Table 7 based on analytical calculations for an average laser beam power $$\sum\nolimits_{j=0}^{7}$$

$P_j/8$ of 1 mW selected for the illustration purposes. Moreover, Table 7 assumes that the photodiode quantum efficiency is 50% and the measurement time of a single symbol is 1 ns [nanosecond].

The discriminator is adapted to simultaneously decode the information bit stream and the cryptographic key bit stream.

TABLE 7

| Optimal operating point of the system for information transmission and cryptographic key distribution using the modified (extended) PAM-4 modulation format and photodiode, see FIG. 3(c). | |
| --- | --- |
| $(P_0 + P_1 + P_2 + P_3 + P_4 + P_5 + P_6 + P_7)/8$ | 1 mW |
| $P_0$ | 0.399867 mW |
| $P_1$ | 0.400383 mW |
| $P_2$ | 0.799885 mW |
| $P_3$ | 0.800615 mW |
| $P_4$ | 1.119993 mW |
| $P_5$ | 1.20082 mW |
| $P_6$ | 1.59998 mW |
| $P_7$ | 1.60102 mW |
| $I_0$ | 249.682 µA |
| $I_1$ | 249.998 µA |
| $I_2$ | 375 µA |
| $I_3$ | 499.456 µA |
| $I_4$ | 499.903 µA |
| $I_5$ | 625 µA |
| $I_6$ | 749.249 µA |
| $I_7$ | 749.793 µA |
| $I_8$ | 875 µA |
| $I_9$ | 999.043 µA |
| $I_{10}$ | 999.675 µA |

It was observed that the optimal operating points change when the signal detection, in addition to the shot noise, is affected by the noise caused by the fluctuations in the intensity of the emitted laser beam or by thermal noise. It was also observed that the optimal operating points change when the power of the signal measured by the eavesdropper is lower or higher than the power of the signal measured by the authorised recipient.

Example 4

Simultaneous Transmission of Information and Distribution of a Cryptographic Key Using Directly Modulated Laser Diode Via Current Modulation An example embodiment is an alternative architecture of the system presented in Examples 1-3, i.e. FIG. 1a, FIG. 2a, FIG. 3a, wherein an external amplitude modulator is used to modulate the light emitted by the laser diode. The amplitude modulator into which the constant power laser beam is coupled, is herein replaced by a direct laser modulation system.

Figure 4:
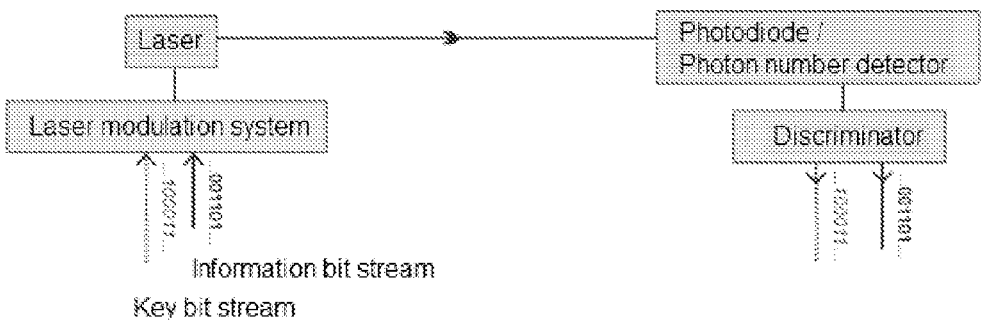
FIG. 4 is an embodiment for simultaneous transmission of information and distribution of a cryptographic key using a transmitter with direct laser modulation (e.g. current modulation of a laser diode).

This example embodiment is illustrated in FIG. 4, wherein a direct laser modulation (e.g. laser diode current modulation) transmitter is used for simultaneous transmission of information and distribution of a cryptographic key. The laser modulation system is adapted to convert the incoming stream of information and cryptographic key bits into an electrical signal used for direct laser modulation. The electrical signal generated by the laser modulation system drives the laser diode. Apart from the modification presented above (no external amplitude modulator), this system does not differ from those described in the preceding examples.

The system may be used to implement a modified (extended) OOK modulation format, a modified (extended) PPM modulation format, and a modified (extended) PAM-4 modulation format.

Regardless of the changes in the architecture of the inventive system, the implementation of the inventive method remains unchanged, and the methods for implementing the aspects of the disclosed embodiments described in examples 1-3 remain identical.

Example 5

Simultaneous Transmission of Information and Distribution of a Cryptographic Key Using Multiple Laser Light Sources An example embodiment is an alternative architecture of the system of the aspects of the disclosed embodiments presented in Examples 1-3, i.e. FIG. 1a, FIG. 2a, FIG. 3a, wherein an external amplitude modulator is used to modulate the light emitted by the laser diode. The amplitude modulator, into which a constant power laser beam from a single laser diode is coupled, is replaced by a subsystem consisting of multiple laser diodes.

Figure 5A:
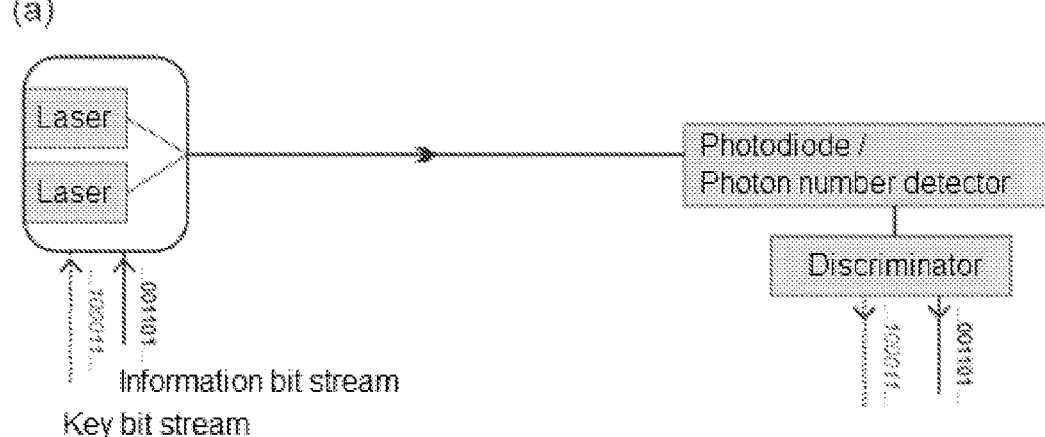
FIG. 5 is an embodiment for simultaneous transmission of information and distribution of a cryptographic key using a transmitter comprising multiple laser diodes, (a) a system for implementing a modified (extended) OOK or PPM modulation format (b) a system for implementing a modified (extended) PAM-4 modulation format.
Figure 5B:
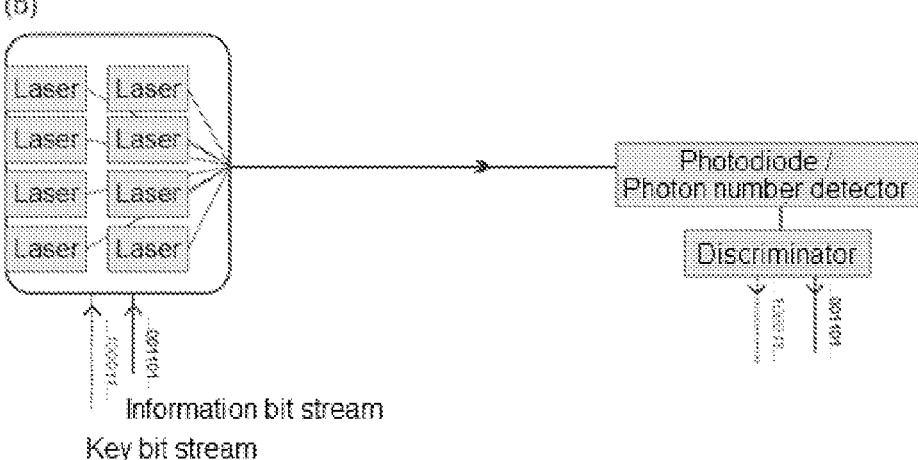

This example embodiment is illustrated in FIG. 5, which shows an alternative variants of systems for simultaneous transmission of information and distribution of a cryptographic key using a transmitter consisting of multiple laser diodes: FIG. 5(a) a system for implementing a modified (extended) OOK or PPM modulation format; FIG. 5(b) a system for implementing the modified (extended) PAM-4 modulation format.

In this example, each of the laser diodes is adapted to generate an optical pulse with a constant intensity determined by the set of modulation symbols used.

In the OOK modulation format, two laser diodes are required that generate pulses with powers corresponding to states $P_1$ and $P_2$, with the first diode generating a pulse with a power corresponding to state $P_1$, and the second diode generating a pulse with a power corresponding to state $P_2$.

In the PPM modulation format, two laser diodes are required that generate pulses with powers corresponding to states $P_0$ and $P_1$, with the first diode generating a pulse with a power corresponding to state $P_0$, and the second diode generating a pulse with a power corresponding to state $P_1$.

In the PAM-4 modulation format, eight laser diodes are required, generating pulses with powers corresponding to $P_0$, $P_1$, $P_2$, $P_3$, $P_4$, $P_5$, $P_6$, $P_7$ states. Wherein the first diode generates a pulse of a power corresponding to state $P_0$, the second diode generates a pulse of a power corresponding to state $P_1$, the third diode generates a pulse of a power corresponding to state $P_2$, the fourth diode generates a pulse of a power corresponding to state $P_3$, the fifth diode generates a pulse of a power corresponding to state $P_4$, the sixth diode generates a pulse of a power corresponding to state $P_5$, the seventh diode generates a pulse of a power corresponding to state $P_6$, while the eighth diode generates a pulse of a power corresponding to state $P_7$. Apart from the modification presented above (no external amplitude modulator), this system does not differ from those described in the examples 1-3.

Regardless of the changes in the architecture of the inventive system, the implementation of the inventive method remains unchanged, and the methods for implementing the aspects of the disclosed embodiments described in examples 1-3 remain identical.

Potential Areas of Application of the Aspects of the Disclosed Embodiments

The aspects of the disclosed embodiments are applicable to the telecommunications industry, in particular among operators offering terrestrial telecommunications services (using existing fibre optic infrastructure) or satellite telecommunications services (using optical satellite communications) with enhanced security. Such services are provided e.g. for the military, government administration, special services or the banking sector. The aspects of the disclosed embodiments may also be useful for optical communications equipment companies intending to provide the functionality of cryptographic key distribution in physical layer.

The invention claimed is:

1. A method for optical communication with simultaneous transmission of bits of information and distribution of cryptographic key bits using laser beam intensity modulation in a transmitter and using direct detection in a receiver,
    wherein a laser beam of a specific optical carrier wavelength is modulated according to a common set of modulation symbols, each modulation symbol occupying a same symbol interval of the optical signal encoding simultaneously information bits and cryptographic key bits,
    wherein symbols used to encode different information bits differ within the symbol interval in exclusively a single parameter selected from the group comprising light intensity and time delay, while symbols used to encode different cryptographic key bits differ exclusively in light intensity, such that the information bits and the cryptographic key bits are encoded concurrently within the same modulation symbol,
    wherein the information bits are recoverable at the receiver based on a temporal position of a detected optical pulse within the symbol interval, and the cryptographic key bits are recoverable based on a detected optical intensity or average photon number relative to predetermined decision thresholds,
    wherein a source of the laser beam of the specific optical carrier wavelength is configured to emit quasi-monochromatic light of a wavelength in a range of 400 to 1600 nm.

2. The method according to claim 1, wherein the common set of modulation symbols used in the communication are modified versions of standard modulation formats including amplitude-based 'OOK', 'PAM', or time delay-based 'PPM'.

3. The method according to claim 1 wherein the source of the laser beam comprises a continuous-wave laser or a pulsed laser with a high repetition rate connected by an optical path to an amplitude modulator.

4. The method according to claim 3, wherein the amplitude modulator is used to simultaneously encode an information bit stream and a cryptographic key bit stream.

5. The method according to claim 1, wherein the source of the laser beam comprises a laser with a direct beam modulation system.

6. The method according to claim 1, wherein the source of the laser beam comprises two or more laser diodes emitting light beams of the same wavelength in the range of 400 to 1600 nm, but of different light power, and wherein the beams emitted by the two or more laser diodes are combined into a single light beam of the specific optical carrier wavelength.

7. The method according to claim 1, wherein the receiver comprises a photodiode or photon number detector, which is connected to a discriminator.

8. The method according to claim 7, wherein the receiver is used to measure a power of a light beam, for optical signals with a power of more than 100 nW.

9. The method according to claim 7, wherein the receiver comprises a photon number detector to measure single photons, for optical signals with a power of less than 100 nW.

10. The method according to claim 7, wherein the discriminator is used to simultaneously decode the information bit stream and the cryptographic key bit stream.

11. The method according to claim 2, wherein in the extended OOK modulation format, the ratio $$\left(\frac{N_1}{N_2}\right)$$

of the average number of photons in pulses corresponding to different bits of the cryptographic key in the scheme using single photon detection is more than 50%.

12. The method according to claim 2, wherein in the extended PPM modulation format, the ratio $$\left(\frac{N_0}{N_1}\right)$$

of the average number of photons in pulses corresponding to different bits of the cryptographic key in the scheme using single photon detection is more than 50%.

13. The method according to claim 2, wherein in the extended OOK modulation format, the ratio $$\left(\frac{P_1}{P_2}\right)$$

of the power of pulses corresponding to different bits of the cryptographic key in the scheme using photodiode detection is more than 85%.

14. The method according to claim 2, wherein in the extended PPM modulation format, the ratio $$\left(\frac{P_0}{P_1}\right)$$

of the power of pulses corresponding to different bits of the cryptographic key in the scheme using photodiode detection is more than 85%.

15. The method according to claim 2, wherein in the extended PAM modulation format, each of the pulse power ratios $$\left(\frac{P_0}{P_1}, \frac{P_2}{P_3}, \frac{P_4}{P_5}, \frac{P_6}{P_7}\right)$$

corresponding to different bits of the cryptographic key in the scheme using photodiode detection is more than 85%.

16. The method according to claim 1, wherein a single communication channel is established between the transmitter and the receiver using a laser beam of a specific optical carrier wavelength, with the channel being used for simultaneously transmitting information bits and cryptographic key bits from the transmitter to the receiver.

17. The method according to claim 1, wherein the transmitter and the receiver are connected by one or more additional communication channels.

18. A system for optical communication realising simultaneous transmission of information bits and distribution of cryptographic key bits using intensity modulation and direct detection, the system comprising a transmitter and a receiver, wherein the transmitter comprises a source of a modulated laser beam of a specific optical carrier wavelength, and the receiver comprises a photodiode or a photon number detector connected to a discriminator, wherein the transmitter is configured to simultaneously transmit at a specific optical carrier wavelength information bits and cryptographic key bits using a common set of modulation symbols, each modulation symbol occupying a same symbol interval of an optical signal and encoding simultaneously at least one information bit and at least one cryptographic key bit, wherein within the common set of modulation symbols, symbols used to encode different information bits differ within the symbol interval in exclusively a single parameter selected from the group comprising light intensity and time delay, while symbols used to encode different cryptographic key bits differ exclusively in light intensity, wherein the discriminator is configured to recover the information bits based on a detected temporal position of an optical pulse within the symbol interval, and to recover the cryptographic key bits based on a detected optical intensity or average photon number relative to predetermined decision thresholds, wherein the source of the modulated laser beam of the specific optical carrier wavelength is configured to emit quasi-monochromatic light of a wavelength in the range of 400 to 1600 nm.

19. The system according to claim 18, wherein the source of the modulated laser beam of a specific optical carrier wavelength is a continuous-wave laser or a pulsed laser with a high repetition rate connected by an optical path to an amplitude modulator.

20. The system according to claim 18, wherein the source of the modulated laser beam of the specific optical carrier wavelength is a laser with a direct beam modulation system.

21. The system according to claim 18, wherein the source of the modulated laser beam of the specific optical carrier wavelength is based on two or more laser diodes configured to emit a light beam of the same wavelength, but of a different power.

22. The system according to claim 18, wherein the receiver comprises a photodiode for measuring a light beam power or a photon number detector for measuring single photons, which is connected to a discriminator.

23. The system according to claim 22, wherein the discriminator is configured to simultaneously decode the information bit stream and the cryptographic key bit stream.

24. The system according to claim 19, wherein the modulator is configured to implement a modified (extended) OOK modulation format, wherein the number of symbols is increased by adding symbols that allow to distinguish key bits based on light intensity levels, and the ratio $$\left(\frac{N_1}{N_2}\right)$$

of the average number of photons in pulses corresponding to different cryptographic key bits in the scheme using single photon detection is more than 50%.

25. The system according to claim 19, wherein the modulator is configured to implement a modified (extended) PPM modulation format, wherein the number of symbols is increased by adding symbols that allow to distinguish key bits based on light intensity levels, and the ratio $$\left(\frac{N_0}{N_1}\right)$$

of the average number or photons in pulses corresponding to different cryptographic key bits in the scheme using single photon detection is more than 50%.

26. The system according to claim 19, wherein the modulator is configured to implement a modified (extended) OOK modulation format, wherein the number of symbols is increased by adding symbols that allow to distinguish key bits based on light intensity levels, and the ratio $$\left(\frac{P_1}{P_2}\right)$$

of light power of pulses corresponding to different cryptographic key bits in the scheme using photodiode detection is more than 85%.

27. The system according to claim 19, wherein the modulator is configured to implement a modified (extended) PPM modulation format, wherein the number of symbols is increased by adding symbols that allow to distinguish key bits based on light intensity levels, and the ratio $$\left(\frac{P_0}{P_1}\right)$$

of light power of pulses corresponding to different cryptographic key bits in the scheme using photodiode detection is more than 85%.

28. The system according to claim 19, wherein the modulator is configured to implement a modified (extended) PAM modulation format, wherein the number of symbols is increased by adding symbols that allow to distinguish key bits based on light intensity levels, and each of the ratios of light power of pulses $$\left( \frac{P_0}{P_1}, \frac{P_2}{P_3}, \frac{P_4}{P_5}, \frac{P_6}{P_7} \right)$$

corresponding to different cryptographic key bits in the scheme using photodiode detection is more than 85%.

* * * * *